United States Patent [19]

Shea et al.

[11] 3,869,302

[45] Mar. 4, 1975

[54] METHOD FOR MANUFACTURE OF GRAPHITE FLOUR

[75] Inventors: Frederick L. Shea; Mack P. Whittaker, both of Johnson City; Lloyd I. Grindstaff, Elizabethton, all of Tenn.

[73] Assignee: Great Lake Carbon Corporation, New York, N.Y.

[22] Filed: Aug. 1, 1972

[21] Appl. No.: 276,990

Related U.S. Application Data

[63] Continuation-in-part of Ser. No. 61,808, Aug. 6, 1970, abandoned.

[52] U.S. Cl.............. 117/46 CC, 264/5, 264/8, 264/12, 264/13, 264/15, 264/29, 423/449, 117/100 B

[51] Int. Cl............................................ C01b 31/04

[58] Field of Search.......... 117/46 CC; 264/5, 8, 12, 264/13, 15, 29; 423/449

[56] References Cited
UNITED STATES PATENTS

| | | | |
|---|---|---|---|
| 2,697,028 | 12/1954 | Baker et al. | 423/449 |
| 3,392,216 | 7/1968 | Otani | 264/85 |

*Primary Examiner*—William D. Martin
*Assistant Examiner*—Janyce A. Bell
*Attorney, Agent, or Firm*—Donald R. Cassady

[57] ABSTRACT

Graphite flour is prepared by forming spheres of a carbon-forming pitch or like material; protecting the surface of the spheres by the application and curing of a thermosetting resin thereupon; then carbonizing and graphitizing the surface protected pitch spheres.

7 Claims, No Drawings

METHOD FOR MANUFACTURE OF GRAPHITE FLOUR

CROSS REFERENCE TO RELATED APPLICATIONS

This application is a continuation-in-part of our co-pending application Ser. No. 61,808, filed Aug. 6, 1970, and now abandoned.

BACKGROUND OF THE INVENTION

Graphite is a material which is a good conductor of heat and electricity, resistant to high temperatures, and also highly resistant to attack by most chemical reagents. Accordingly, graphite is an extremely important and useful material in industry in a great variety of applications.

Almost all the artificial graphite which is made today is prepared according to the teaching first set forth by E. G. Acheson in 1896. Acheson's process, which was the first successful process for the commercial production of artificial graphite articles, has been somewhat modified since that time. As a general rule, artificial graphite articles are fabricated from calcined petroleum coke base material. According to the process, a coal or petroleum derivative is first coked and the coke product is milled. The milled coke is mixed with coal tar pitch and molded or extruded into the desired shaped article by the application of heat and pressure. Alternatively, a small portion of anthracite coal is added to the coke-pitch mixture prior to molding. The resultant shaped articles are baked to about 1,000°C. and subsequently graphitized at 2,500°C. to 3,000°C. in an electric furnace.

When the above method is followed, a shaped graphite article, or a graphite stock is produced, which can be shaped into the desired article by machining or other similar physical process.

In preparing nuclear fuel cell elements, nuclear fuel and carbon are dispersed in a resin or pitch matrix and cured. A desired form of carbon for such a use consists of large, anisotropic graphite crystallites fabricated into an isotropic mass.

In U.S. Pat. No. 3,245,880, Martin et al teach the use of graphite aggregates prepared by milling fully formed graphite in the fabrication of nuclear fuel elements and the like. In order to obtain isotropic bodies for this use, the inventors state that graphitization of the raw coke starting material be carried out either (a) after the particles have been heat treated under mechanical pressure; or (b) after the particles have been thoroughly mixed with a plasticizer; or (c) after the crystallite arrangement of the particles has been disordered in some other suitable manner. If the raw coke particles are calcined or graphitized before any of these alternatives, then graphitized bodies prepared from such particles and a binder are incapable of, or do not result in, the achievement or production of graphitized bodies in accordance with their invention, which are particularly well suited for use in nuclear reactors.

It is an object of this invention to prepare carbon spheres of selectable anisotrophy from carbonaceous spheres, and which sphere can then be used to fabricate isotropic nuclear fuel cell elements, and the like, by other than the above enumerated means.

SUMMARY OF THE INVENTION

This application is concerned with a method for preparing a graphite flour consisting of uniform or nearly uniform spherical bodies.

More particularly, this invention is related to a method for preparing uniform spherical bodies, hereinafter called spheres, of a graphitizable, carbon-forming pitch, and carbonizing and graphitizing the spheres without their coalescence.

Still more particularly, it is related to a method of preparing uniform or nearly uniform graphite spheres of variable but controllable isotrophy.

By the process of this invention, pitch, of coal or petroleum derivation, is formed into spheres of about $10\mu$ to $3000\mu$ diameter by nebulizing the melted pitch into an inert dispersant at or below the softening point of the pitch, thereafter protecting the spheres from interreacting upon further heating while in contact there between. This surface protecting step is accomplished by coating the surface of the spheres with a thermosetting resin and setting the resin. Alternatively, the pitch is nebulized into an inert dispersant containing a thermosetting resin, and, when necessary, a solvent for such resin, then setting or curing the resin. By this method the spheres are coated with a resin surface. This surface protects the spheres from coalescence upon further heating.

The coated spheres are thereafter carbonized and graphitized in a conventional manner.

Nebulization can be accomplished by pneumatically or hydraulically forcing the molten pitch through spray nozzles or by dropping the pitch onto the periphery of a spinning disc or the like.

Alternatively, uniform spheres can be formed by nebulizing the pitch from an ultransonic generating surface.

DETAILED DESCRIPTION OF THE INVENTION

As used in this description and the appended claims, a graphitizable carbon-forming pitch of coal or petroleum derivation is meant to include high melting pitches, those having melting points between about 60°C. and 300°C. as determined by the ring and ball method, which will carbonize and graphitize when heated to temperatures of from about 1,000°C. to 3,000°C.

"Anisotropic spheres" are those containing a well-defined microscopic structure and which exhibit different physical properties as for example different thermal expansion characteristics when measured along various axes of the sphere.

Starting material can include petroleum based thermal tar, coal tar, tars obtained from the production of ethylene by cracking gas oil or naphtha commonly called PR resins, or the like. The isotrophy characteristics of the sphere is controllable by the choice and blending of feedstocks. Thermal tar or a high temperature coal tar which has been filtered to free it from second phase material will make spheres of high crystalline perfection. This degree of perfection can be reduced by blending these starting materials with petroleum feedstocks which, when coked in a conventional coker operation, yield a highly isotropic coke, as for example, a Wilmington coke, one having a longitudinal coefficient of thermal expansion (CTE) of $30 \times 10^7$ in.-/in./°C. over the temperature range 25° – 100°C. Additionally, the presence of quinoline insoluble second phase material in coal tar pitch tends to reduce the anisotropy of the coke and graphite prepared therefrom.

PR resin when used in the process of the invention yields an anisotropic product. Blends of PR resin and pitch or tar containing appreciable amounts of second phase material will produce products of varying crystalline characteristics. Blends of phenolic resins and the like which yield to a glassy non-graphitic coke produce can be formed with a filtered pitch or PR resin to form products of varying anisotropy.

By the method of this invention, the pitch is heated to above its melting point and formed into small spheres by mechanical means. Such nebulization is carried out by forcing the hot pitch through a nozzle or other small orifice under pneumatic or hydraulic pressure. Alternatively, the hot pitch can be nebulized by dropping or pouring it on the peripheral surface of a spinning plate. In this method the centrifugal force developed at the point of contact of the pitch on the plate throws the pitch away from the center of rotation in small spherical particles. Still further the pitch can be fed onto the face plate of an ultrasonic generator held at the melting point of the pitch. The size of the spherical particles formed thereupon varies with the wave length generated by the plate.

In any of the above-described methods of nebulization the formation of spheres can take place in the presence of a dispersant inert to the surface of the formed pitch spheres, as for example nitrogen, argon, water, alcohol, glycerol, or the like. By this method the spheres are cooled to below their melting point. The solidified spheres are collected and coated with a thermosetting resin or like substance. The resin used to coat the spheres may contain a diluting solvent therefor. Typical thermosetting resins which are useful for this purpose include phenolic, furfural, and epoxy resins.

Alternatively, the spheres can be nebulized by any of the aforementioned methods while in the presence of a vaporized epoxy or like thermosetting resin to coat the surface.

The resin-coated spheres are then subjected to a temperature sufficient to cause cross-linking and curing prior to carbonization. Epoxy resins are cured at between about room temperature and 150°C. Curing should be complete at as low a temperature as possible to prevent melting of the spheres during cure.

Carbonization of the coated spheres of pitch is accomplished by heating the spheres upwards to about 1,000°C. in the manner well known to the art. Since the spheres are protected from deformation, coalescence, or aggregation, no special precautions need be taken during carbonization at temperatures above the softening point of the pitch. Only reasonable care need be exercised to prevent breaking or cracking of the surface layer. The carbonized spheres are then graphitized by heating in an inert atmosphere at 3,000°C.

The graphite spheres made by the method of this invention are from about $10\mu$ to $3000\mu$ in diameter depending upon the method of manufacture. With hydraulic pressure nozzles, spheres from $100\mu$ to $3000\mu$ are formed; with pneumatic nozzles, spheres from $10\mu$ to $100\mu$ are formed; the spinning disc and sonic methods can produce spheres over a range of sizes.

The acceptable range of graphite spheres for use in nuclear fuel cell fabrication is from $10\mu$ to $100\mu$.

In a preferred embodiment, a coal tar pitch, Grade 30 S (Allied Chemical, Plastics Division, Norristown, N.J.), is converted to graphitized spheres by the following procedure. The pitch is diluted with light creosote oil, filtered to remove the quinoline insolubles, then stripped in vacuo to remove the light creosote oil. The filtered pitch is warmed by the external application of super-heated steam to a temperature of 110°C. The warm pitch is forced through an appropriately sized nozzle to form spheres ranging in diameter from 20 to $100\mu$. The spheres are allowed to fall into a solution of a 5 weight per cent solution of a resole type phenol formaldehyde resin in ethanol. The spheres are separated by decantation, dried, and the resin cured.

The surface protected particles are then gradually heated to 800°C. to complete the carbonization and then graphitized to 2,800°C. in the usual manner well known to the art.

The graphite product of this invention is useful in the fabrication of nuclear reactor elements in which a fissionable material e.g., uranium oxide, uranium carbide, plutonium, or other fertile material and the moderating graphite are arranged in the reaction chamber and the heat generated therein is removed. For this purpose, the graphitized pitch spheres of this invention are mixed in the desired proportion with the fissionable or fusionable material and fabricated into a composite bar using a furfural resin or pitch binder as the matrix material.

The graphite product of this invention is also useful in the fabrication of reflector mantles which can surround the reaction zone in nuclear reactors and serve to reflect a portion of the neutrons leaving the reaction zone. For this use, it is desirable to fabricate graphite bodies in the form of spheres, plates, blocks, or tubes typically one-half inch in diameter or larger or in the form of other shaped "massive structural" bodies. Such shaped pieces are made by pressing, molding, or shaping the above described graphitized pitch spheres and a graphitizable binder system into the desired size and shape followed by baking and graphitizing procedures. The pressing or shaping of the carbonaceous material may be carried out at ambient room temperature or elevated temperature depending on the softening point of the binder.

Several methods for making the graphitized, pitch spheres may be employed as have been hereinbefore described, but in all instances the formed and graphitized spheres to be used in nuclear reactors and prepared in accordance with the present invention are made in such a manner that the arrangement of crystallites in the graphitized spheres is in a highly ordered, oriented, state.

The ordered arrangement within the spheres in the carbonaceous materials can be determined by X-ray diffraction and magnetic techniques.

What is claimed is:

1. A method for the manufacture of graphite flour which comprises:
   a. nebulizing a graphitizable, carbon-forming pitch of coal or petroleum origin into spheres of about 10 to about $3000\mu$ diameter;
   b. coating the surface of the spheres with a thermosetting resin and setting the resin to prevent coalescence thereof when heating to above their melting point while in contact therebetween; and
   c. carbonizing and graphitizing the coated spheres by heating to about 800°C.–1,000°C. then to about 2,500°C. – 3,000°C. in an inert atmosphere.

2. The method of claim 1 wherein nebulization is accomplished by forcing the hot pitch through a nozzle.

3. The method of claim 1 wherein the neubulization is accomplished by dropping the pitch on the peripheral surface of a spinning plate.

4. The method of claim 1 wherein nebulization is accomplished by feeding the pitch onto the face plate of an ultrasonic generator.

5. The method of claim 1 wherein the thermosetting resin coating is added during the nebulization step.

6. The method of claim 1 wherein the thermosetting resin coating is added after the nebulization step.

7. The method of claim 1 wherein the graphite flour consists of anisotropic spheres.

* * * * *

UNITED STATES PATENT OFFICE
CERTIFICATE OF CORRECTION

PATENT NO. : 3,869,302
DATED : March 4, 1975
INVENTOR(S) : Frederick L. Shea, Mack P. Whittaker, Lloyd I. Grindstaff It is certified that error appears in the above-identified patent and that said Letters Patent are hereby corrected as shown below:

Page 1, Entry 75:
　　The address of "Mack P. Whittaker" should read -- Stamford, Conn. --

Column 2, Line 64:
　　Delete "$10^7$" and replace with -- $10^{-7}$ --

Column 5, Line 2:
　　Delete "neubulization" and replace with -- nebulization --

Signed and sealed this 20th day of May 1975.

(SEAL)
Attest:

RUTH C. MASON
Attesting Officer

C. MARSHALL DANN
Commissioner of Patents
and Trademarks